United States Patent
Kuo

(10) Patent No.: US 10,970,557 B2
(45) Date of Patent: Apr. 6, 2021

(54) POSTURE DETERMINATION METHOD, ELECTRONIC SYSTEM AND NON-TRANSITORY COMPUTER-READABLE RECORDING MEDIUM

(71) Applicant: Wistron Corporation, New Taipei (TW)

(72) Inventor: Shih-Hao Kuo, New Taipei (TW)

(73) Assignee: Wistron Corporation, New Taipei (TW)

( * ) Notice: Subject to any disclaimer, the term of this patent is extended or adjusted under 35 U.S.C. 154(b) by 127 days.

(21) Appl. No.: 16/041,846

(22) Filed: Jul. 23, 2018

(65) Prior Publication Data
US 2019/0332868 A1 Oct. 31, 2019

(30) Foreign Application Priority Data
Apr. 27, 2018 (TW) ................................ 107114595

(51) Int. Cl.
*G06K 9/00* (2006.01)
*G08B 21/04* (2006.01)
(Continued)

(52) U.S. Cl.
CPC ..... *G06K 9/00771* (2013.01); *G06K 9/00248* (2013.01); *G06K 9/00375* (2013.01);
(Continued)

(58) Field of Classification Search
CPC ........... G06K 9/00771; G06K 9/00375; G06K 9/00248; G06T 7/246; G06T 7/73; G08B 21/0476
See application file for complete search history.

(56) References Cited

U.S. PATENT DOCUMENTS

2010/0328319 A1* 12/2010 Ikenoue ................ A63F 13/211
345/474
2013/0279756 A1* 10/2013 Menadeva ......... G06K 9/00389
382/103
(Continued)

FOREIGN PATENT DOCUMENTS

CN 101937604 1/2011
CN 101937605 6/2012
(Continued)

OTHER PUBLICATIONS

"Office Action of Taiwan Counterpart Application", dated Mar. 5, 2019, p. 1-p. 8.
(Continued)

Primary Examiner — Qian Yang
(74) Attorney, Agent, or Firm — JCIPRNET

(57) ABSTRACT

A posture determination method applicable to an electronic system including an image capturing device is provided. The image capturing device is set up corresponding to a target. The posture determination method includes: acquiring a plurality of consecutive images captured by the image capturing device; performing a motion detection on the consecutive images; determining whether an image content of the consecutive images is static after a movement according to a detection result of the motion detection; and determining a posture of the target when the image content is static after the movement. In addition, the electronic system and a non-transitory computer-readable recording medium using the method are also provided.

19 Claims, 9 Drawing Sheets

(51) Int. Cl.
*G06T 7/73* (2017.01)
*G06T 7/246* (2017.01)

(52) U.S. Cl.
CPC ............... *G06T 7/246* (2017.01); *G06T 7/73* (2017.01); *G08B 21/0476* (2013.01)

(56) References Cited

U.S. PATENT DOCUMENTS

2017/0186176 A1* 6/2017 Paluri .................. G06K 9/6212
2018/0068179 A1 3/2018 Derenne et al.

FOREIGN PATENT DOCUMENTS

| CN | 104091408 | 4/2015 |
| CN | 104606003 | 5/2015 |
| CN | 103839373 | 8/2016 |

OTHER PUBLICATIONS

"Office Action of Taiwan Counterpart Application", dated Feb. 19, 2020, pp. 1-9.

* cited by examiner

US 10,970,557 B2

POSTURE DETERMINATION METHOD, ELECTRONIC SYSTEM AND NON-TRANSITORY COMPUTER-READABLE RECORDING MEDIUM

CROSS-REFERENCE TO RELATED APPLICATION

This application claims the priority benefit of Taiwan application serial no. 107114595, filed on Apr. 27, 2018. The entirety of the above-mentioned patent application is hereby incorporated by reference herein and made a part of this specification.

BACKGROUND

Technical Field

The disclosure relates to a posture determination method, an electronic system, and a non-transitory computer-readable recording medium.

Description of Related Art

In recent years, the speed of population aging becomes faster. In busy metropolises, children cannot take care of their elders at all times. Therefore, home care becomes more and more important, home care institutions and care dispatch centers are also established everywhere.

Even with elderly care or patient care facilities, the caregivers cannot one on one take care of all elders or patients. Therefore, these facilities often install surveillance systems such as cameras indoor, so as to see whether the elders or patients lying on beds are in a dangerous situation. Nevertheless, the current surveillance systems are not equipped with the image recognition function, and the caregivers have to monitor video images at all time to ensure the safety of the elders or patients. Accordingly, a cost-effective automatic system capable of automatically issuing warning messages to warn that the elders or patients lying on beds may be in danger is urgently needed.

SUMMARY

The disclosure provides a posture determination method, an electronic system, and a non-transitory computer-readable recording medium which are capable of determining a current posture of a target and prompting at appropriate timing, are reliable, and require low costs.

In an embodiment of the disclosure, a posture determination method is provided. The posture determination method is applicable to an electronic system including an image capturing device, and the image capturing device is set up corresponding to a target. The posture determination method includes the following steps. A plurality of consecutive images captured by the image capturing device are acquired. A motion detection is performed on the consecutive images. Whether an image content of the consecutive images is static after a movement is determined according to a detection result of the motion detection. A posture of the target when the image content is static after the movement is determined.

From another aspect, an electronic system including an image capturing device and a processor is provided in an embodiment of the disclosure. The image capturing device is set up corresponding to a target and is configured for capturing a plurality of consecutive images. The processor is coupled to the image capturing device, and the processor can acquire the consecutive images captured by the image capturing device; perform a motion detection on the consecutive images; determine whether an image content of the consecutive images is static after a movement according to a detection result of the motion detection; and determine a posture of the target when the image content is static after the movement.

From yet another aspect, a non-transitory computer-readable recording medium is provided by an embodiment of the disclosure, and a program code is stored in the non-transitory computer-readable recording medium. A posture determination method is performed when the program code is loaded to a computer and executed. The posture determination method includes the following steps. A plurality of consecutive images are acquired. A motion detection is performed on the consecutive images. Whether an image content of the consecutive images is static after a movement is determined according to a detection result of the motion detection. A posture of the target is determined when the image content is static after the movement.

To sum up, in the posture determination method, the electronic system, and the non-transitory computer-readable recording medium provided by the embodiments of the disclosure, the motion detection is performed on the consecutive images captured by the image capturing device. In this way, the image of which the image content is static after a movement is found from the consecutive images, so as to perform the image analysis to determine the posture of the target when the target is static after the movement. The calculation resources required to be consumed by the motion detection are considerably less than the calculation resource required to be consumed by the image analysis. Therefore, in the embodiments of the disclosure, the computation load is significantly reduced, and the cost-saving and reliable posture determination method and tool are provided.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

A posture determination method is introduced by the embodiments of the disclosure. A posture of a target is determined through a plurality of consecutive images captured by an image capturing device. For instance, a relative relationship between a side orientation of the target and the image capturing device is determined. Particularly, since the target changes the posture only after a movement, the posture of the target is further analyzed and determined only after an image content of the consecutive images in motion is changed to be static in the embodiments of the disclosure. A calculation amount required for determining whether the image content is in motion is significantly less than a calculation amount required for performing an image analysis to determine a target posture, and therefore, the method provided by the disclosure requires significantly less computation load of a system.

Figure 1:
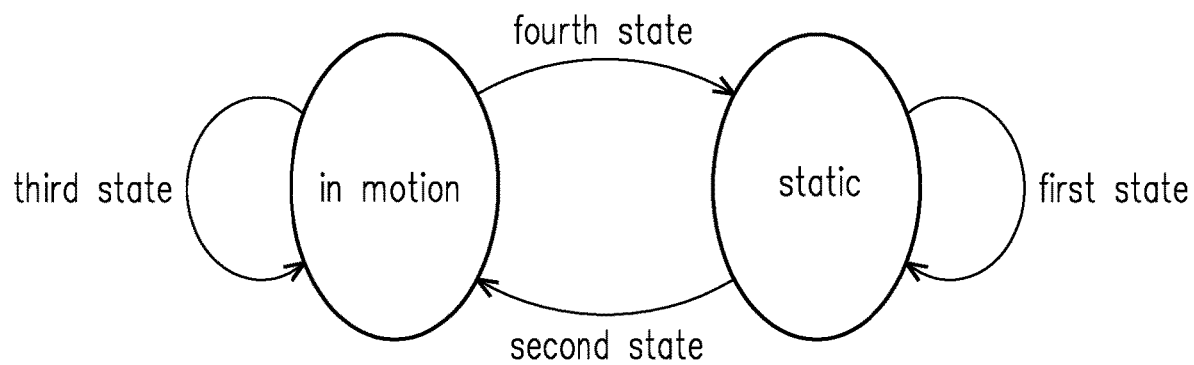
FIG. 1 is a schematic diagram illustrating a state of an image content according to an embodiment of the disclosure.

FIG. 1 is a schematic diagram illustrating a state of an image content according to an embodiment of the disclosure. With reference to FIG. 1, an image content of a plurality of consecutive images includes four possible transition states, which are described below as a first state, a second state, a third state, and a fourth state.

A state in which the image content of the consecutive images remains static is called the first state. In some embodiments, when a $n+1^{th}$ image is identical to a $n^{th}$ image, it means that the image content is static, and the transition state from the $n^{th}$ image to the $n+1^{th}$ image is the first state, indicating that the image content is not changed. When a $n+2^{th}$ image is identical to the $n+1^{th}$ image, it means that the image content still remains static, so that the transition state from the $n+1^{th}$ image to the $n+2^{th}$ image is also the first state, indicating that the image content is still not changed.

Note that when a second image is identical to a first image, it means that an initial image content is static, and thereby, the transition state from the first image to the second image is similar to the first state, indicating that the initial image content is static. Nevertheless, in the following description, the first state that appears first is called the initial state rather than the first state.

The state in which the image content of the consecutive images begins a movement after being static is called the second state. In some embodiments, when the $n+2^{th}$ image and a $n+3^{th}$ image are different, it means that the image content is in motion. Hence, since the transition state from the $n+1^{th}$ image to the $n+2^{th}$ image is the first state, and the transition state from the $n+2^{th}$ image to the $n+3^{th}$ image is the second state, it means that the image content begins a movement after being static.

A state in which the image content of the consecutive images remains in motion is called the third state. In some embodiments, when the $n+3^{th}$ image and a $n+4^{th}$ image are different, it means that the image content is in motion. Hence, since the transition state from the $n+2^{th}$ age to the $n+3^{th}$ image is the second state, and the transition state from the $n+3^{th}$ image to the $n+4^{th}$ image is the third state, it means that the image content remains in motion. When the $n+4^{th}$ image and a $n+5^{th}$ image are different, it means that the image content is still in motion. Hence, since the transition state from the $n+3^{th}$ image to the $n+4^{th}$ image is the third state, and the transition state from the $n+4^{th}$ image to the $n+5^{th}$ image is also the third state, it means that the image content still remains in motion.

A state in which the image content of the consecutive images is static after the movement is called the fourth state. In some embodiments, when a $n+6^{th}$ image is identical to a $n+7^{th}$ image, it means that the image content is static (i.e., the transition state from the $n+6^{th}$ image to the $n+7^{th}$ image is the first state). Hence, since the transition state from the $n+4^{th}$ image to the $n+5^{th}$ image is the third state, and the transition state from the $n+5^{th}$ image to the $n+6^{th}$ image is the fourth state, it means that the image content becomes static after the movement.

In some embodiments, when two consecutive images are acquired, the state in which the image content of the two consecutive images is can be obtained according to the foregoing definition.

Note that the image content is determined to be static with no change when two images are identical in the foregoing embodiment, but the disclosure is not limited thereto. In other embodiments, it may be that only when more consecutive images (e.g., 3, 4, 5, or more images) are identical will the image content be determined to be static with no change. Similarly, the image content is determined to be in motion when two images are different in the foregoing embodiment, but the disclosure is not limited thereto. In other embodiments, it may be that only when more consecutive images (e.g., 3, 4, 5, or more images) are different will the image content be determined to be in motion. In other words, the disclosure does not intend to limit the implementation of determining the initial state, the first state, the second state, the third state, and the fourth state, and modification or adjustment can be made by those having ordinary skill in the art according to requirements.

In some embodiments of the disclosure, optical flow information of the consecutive images is calculated, and an image analysis is performed to determine the posture of the target when the transition state is determined to be the fourth state according to the optical flow information. In this way, computation resources can be saved.

Figure 2:
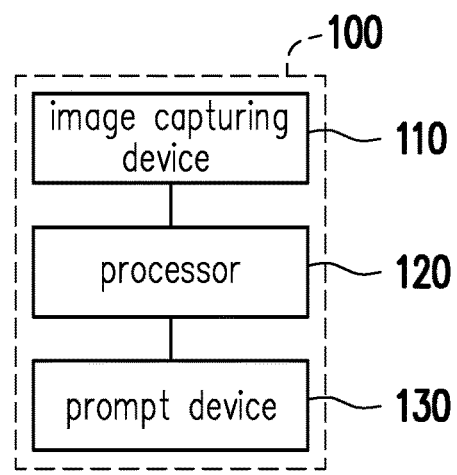
FIG. 2 is a block diagram illustrating an electronic system according to an embodiment of the disclosure.

FIG. 2 is a block diagram illustrating an electronic system according to an embodiment of the disclosure. With reference to FIG. 2, an electronic system 100 includes an image capturing device 110, a processor 120, and a prompt device 130 and is configured to perform the posture determination method introduced by the embodiments of the disclosure for determining the posture of the target. Among them, the processor 120 is coupled to the image capturing device 110 and the prompt device 130. In some embodiments, the electronic system 100 is, for example, a system for monitoring sleep postures of the elderly or infants in long-term care facilities or nursing facilities. The electronic system 100 is capable of determining whether an elderly person or an infant sleeps with a bad posture and is capable of recording sleep quality or counting a number of times of rolling over of the elderly person or the infant. In other embodiments, the electronic system 100 may also be a system used in a hospital ward for monitoring, for example, a posture of a patient, and the disclosure is not limited thereto.

The image capturing device 110 is set up corresponding to a target and is configured for capturing a plurality of consecutive images. To be specific, the image capturing device 110 is set up for capturing the target, and thereby, the target is included in a field of view of the image capturing device 110 if the target is not shielded or covered by an object. In some embodiments, the image capturing device 110 is, for example, an infrared camera and the field of view of the image capturing device 110 is set up to include at least an upper half of a bed. In other embodiments, the image capturing device 110 may also be implemented as a black and white camera or a color camera as required, and the disclosure is not limited thereto.

The processor 120 is configured for acquiring the consecutive images captured by the image capturing device 110 from the image capturing device 110 and performing an image analysis to determine the posture of the target when determining that the transition state of the consecutive images is the fourth state. In addition, the processor 120 further issues a prompt message through the prompt device 130 after determining the posture of the target to prompt a user of the posture of the target determined by the processor 120. In an embodiment, the processor 120 may be, for example, a dual-core, a quad-core, an eight-core, or other type of central processing unit (CPU), a system-on-chip (SOC), an application processor, a media processor, a microprocessor, a digital signal processor or other type, and the disclosure does not intend to limit the processor types used for implementation.

The prompt device 130 is configured for issuing the prompt message according to a command from the processor 120. In some embodiments, the prompt device 130 is, for example, one of a speaker, a display, or a communication module or a combination of the foregoing. A speaker can issue the prompt message to prompt the user by producing sound or noise, a display can issue the prompt message to prompt the user by presenting pictures or words, and the communication module can issue the prompt message to prompt the user through sending e-mails or text messages, etc. Design or modification can be made by those having ordinary skill in the art as required according to the embodiments of the disclosure, so as to provide the prompt device 130 capable of issuing the prompt message to prompt the user. The disclosure does not intend to limit specific implementation of the prompt device 130 herein.

FIG. 3 to FIG. 7 are flowcharts illustrating a posture determination method according to an embodiment of the disclosure. The posture determination method introduced in the embodiments of FIG. 3 to FIG. 7 is applicable to the electronic system 100 of the embodiment of FIG. 2 and thus is described with reference to each of the elements in the electronic system 100 as follows. In addition, in this embodiment, a system configured for monitoring sleep postures is taken as an example of the electronic system 100, so as to determine whether a person sleeping on the bed is in one of the three postures: lying on the back, lying on the side, or face covered by blanket. Nevertheless, the disclosure is no limited thereto.

Figure 3:
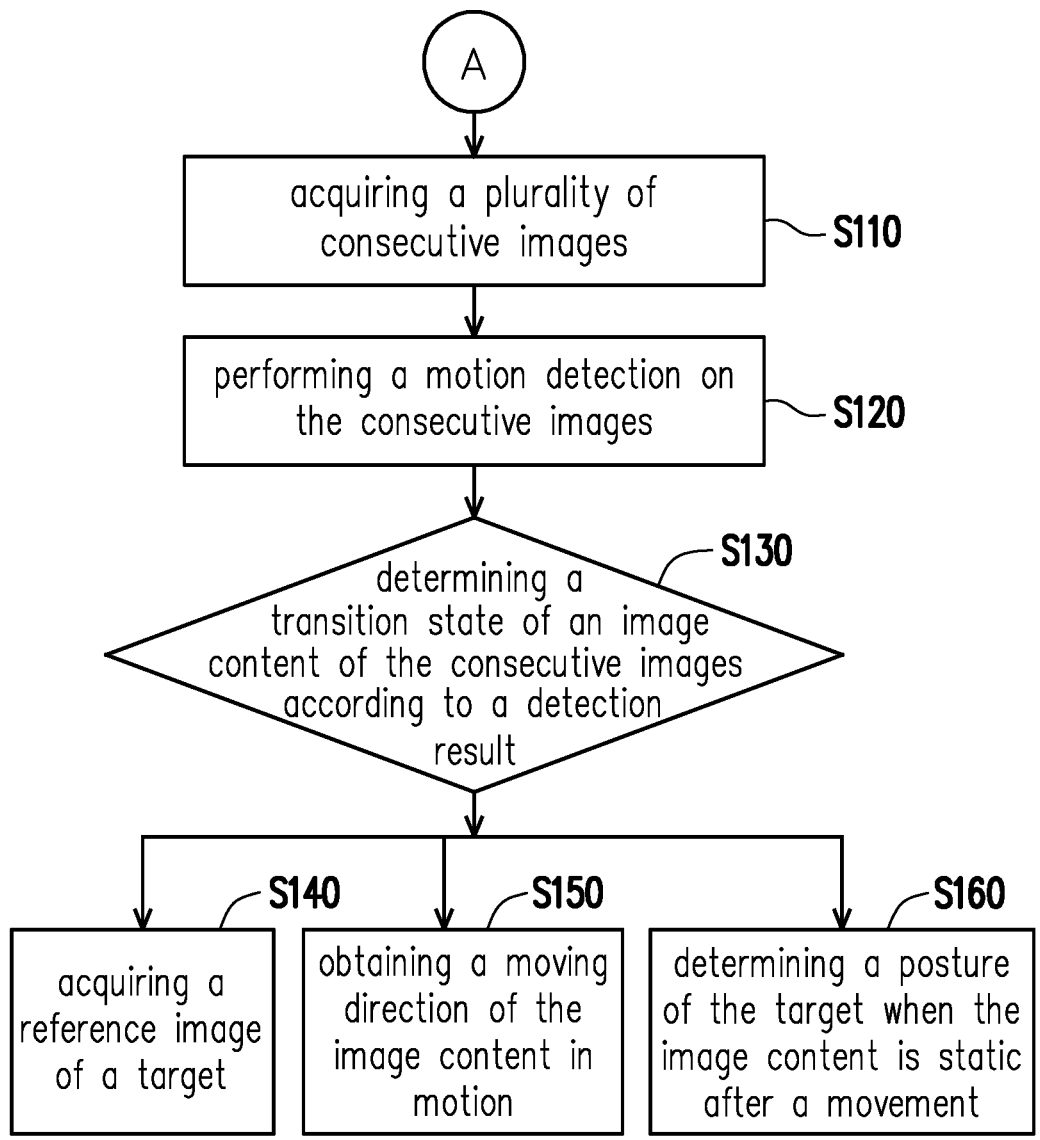
FIG. 3 to FIG. 7 are flowcharts illustrating a posture determination method according to an embodiment of the disclosure.

With reference to FIG. 3, in step S110, the processor 120 acquires the consecutive images captured by the image capturing device 110.

In this embodiment, a lens of the image capturing device 110 is set up to face a bed so as to acquire a plurality of consecutive images of the bed, and the captured images are transmitted to the processor 120. Note that regions outside the bed or regions that require no attention are included in the acquired images according to how the image capturing device 110 is set up or an angle at which the image capturing device 110 is set up. Therefore, the processor 120 may set a region of interest (ROI) as a region for identification, and only an image in the region of interest is processed in the following image analysis and processing, so as to reduce computation load. For instance, the processor 120 may divide the bed into two parts such as an upper part and a lower part, wherein the upper part with a pillow is the region of interest.

In step S120, the processor 120 performs a motion detection on the acquired consecutive images. To be specific, the motion detection is configured for determining whether the image content in the consecutive images is in motion so as to obtain a detection result. For instance, the processor 120 may perform subtraction on two adjacent images in the consecutive images and determines whether the image content is in motion according to a difference between the two images after performing the subtraction. Hence, according to the detection result, the image content of current multiple consecutive images (for example but is not limited to two consecutive images) may be in the initial state, the first state, the second state, the third state, or the fourth state.

In this embodiment, at the beginning, the person lies down on the bed and is static. Hence, when the processor 120 acquires the first two or more consecutive images, the image content is in the initial state (i.e., the first state that is first appeared).

In step S130, the processor 120 determines the transition state of the image content of the consecutive images according to the detection result. If the initial state or the first state is determined, it means that the current image content is static (e.g., the initial state) after the image capturing device 110 acquires a first image. Step S140 is then performed, and the processor 120 acquires a reference image of the target from the consecutive images. If the first state rather than the initial state is determined, it means that the current image content stays static. The processor 120, for example, may not respond to the determination temporarily and continues acquiring the images. Alternatively, in other embodiments, if the first state rather than the initial state is determined, step S140 is performed as well to obtain the reference image of the target, so as to update the reference image of the target. If the second state or the third state is determined, it means that the current image content is changed to be in motion after being static or remains in motion. Step S150 is then performed, and the processor 120 obtains a moving direction of the image content in motion. If the fourth state is determined, it means that the current image content is changed to be static after a movement. Step S160 is then performed, and the processor 120 determines the posture of the target when the image content is static after the movement.

Figure 4:
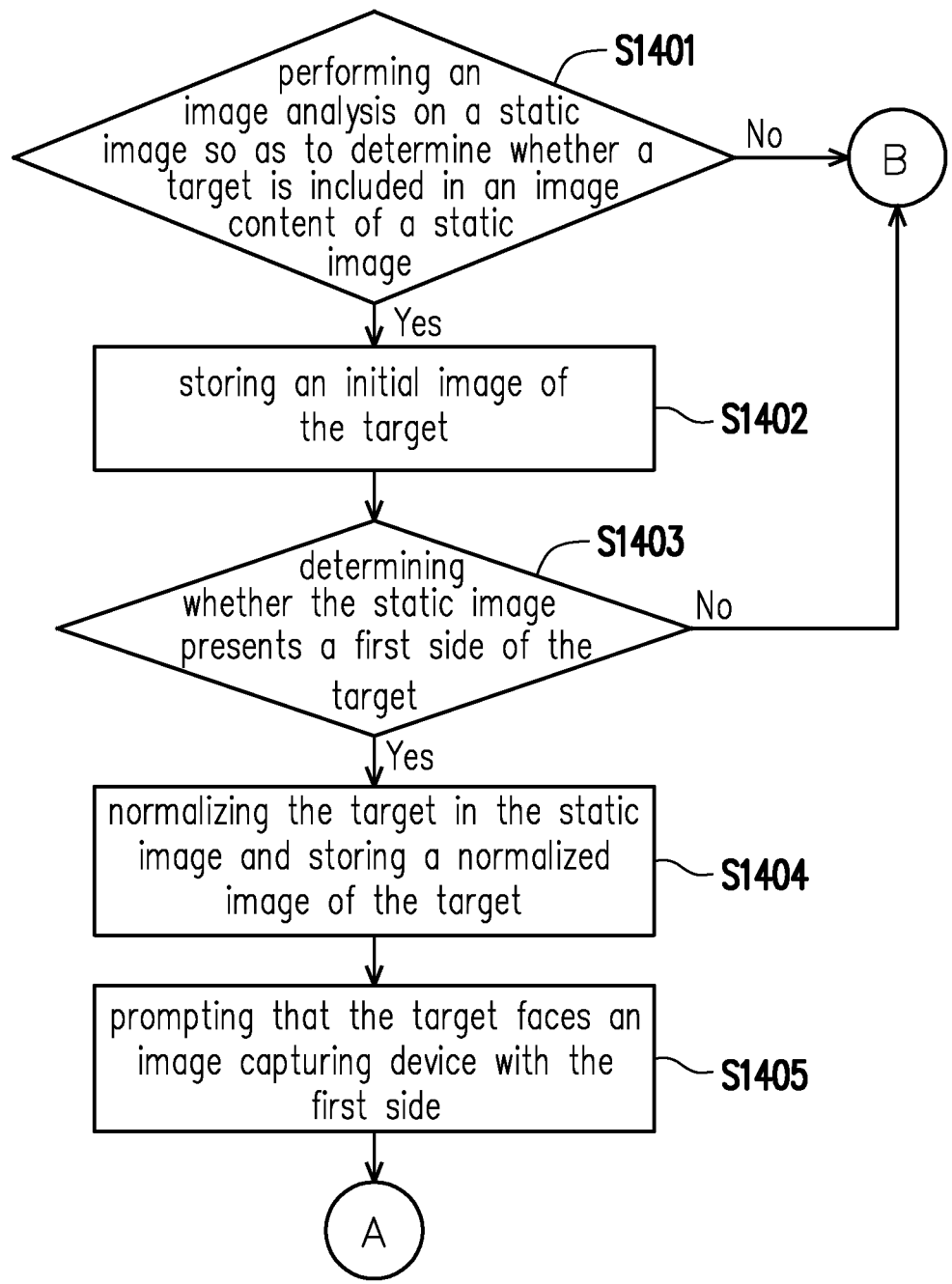
Figure 7:
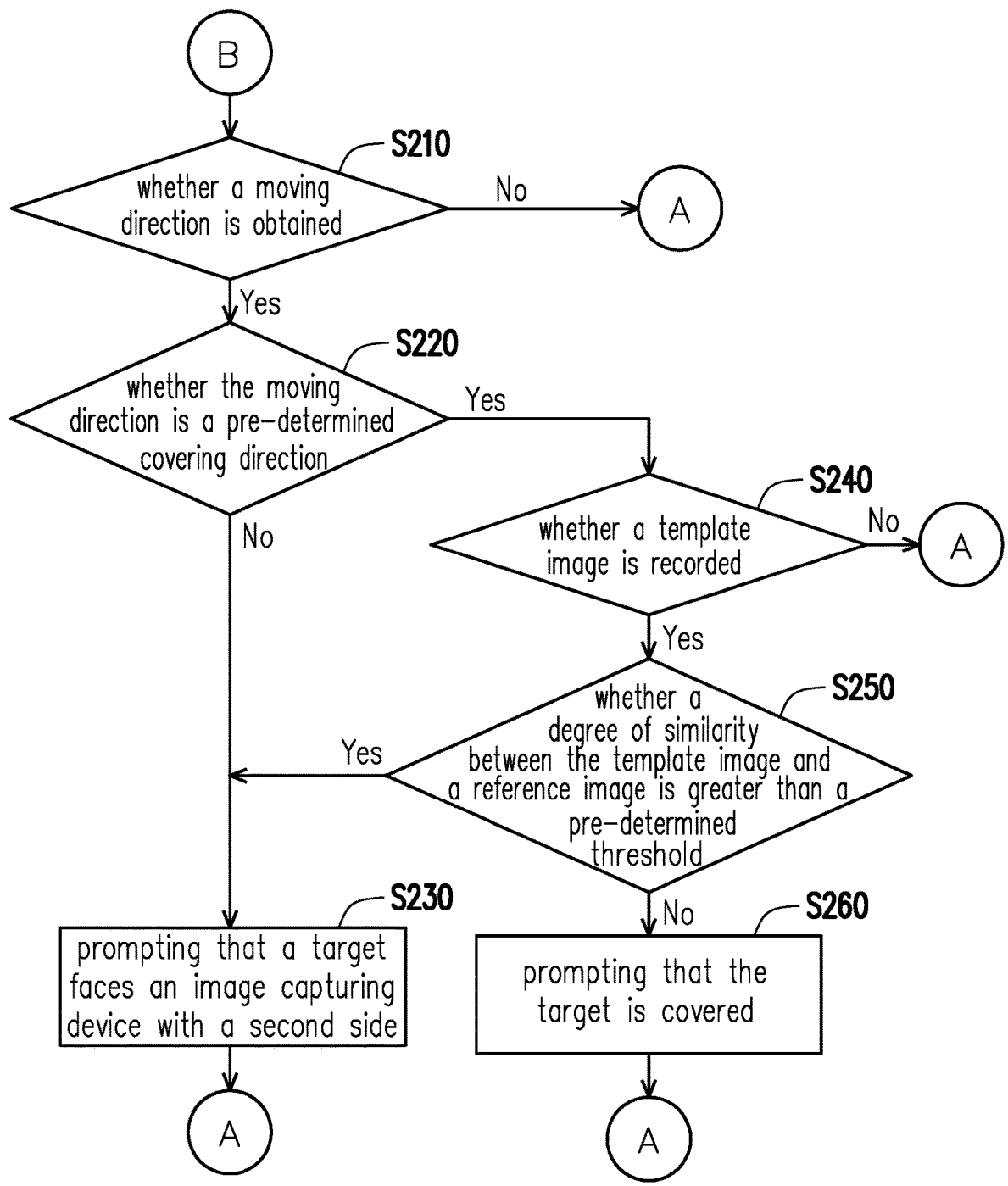

FIG. 4 is a flowchart illustrating step S140 in detail in to an embodiment of the disclosure. When the steps illustrating a flow process of the embodiment of FIG. 4 are performed, it means that the current image content is static right after the image capturing device 110 acquires the first image. With reference to FIG. 4, in step S1401, the processor 120 performs an image analysis on a static image, so as to determine whether the target is included in the image content of the static image. Since the image content of the consecutive images in step S1401 is static, the consecutive images may also be called as static images. If the target is determined to be included in the image content of the static images, step S1402 is performed. Otherwise, a flow process of FIG. 7 is performed (detailed description is provided as follows).

In this embodiment, the target is a human face or a head contour. Therefore, the processor 120 performs a face detection on the static image, so as to determine whether a human face exists in a region of interest of the static image. For instance, the face detection may use various algorithms released by OpenCV and finds, for example, the Haar-like features in the region of interest to find the human face and define a human face outline.

In step S1402, the processor 120 stores an initial image of the target. To be specific, the processor 120 stores an image of the target found in the consecutive images into a storage device (not shown) connected to the processor 120 and serves the image as the initial image of the target. The stored initial image may act as the reference image to be used in the following image analysis.

In this embodiment, a human face image inside the human face outline is stored by the processor 120 as the initial image. Then, the processor 120 begins to trace a position of the human face in the images acquired subsequently. For instance, the processor 120 may use Facial Landmark of OpenCV to perform tracing. In this way, a feature point of the human face is simultaneously outputted when the human face and the position are outputted.

In step S1403, the processor 120 determines whether the static image presents a first side of the target for determining the posture of the target. To be specific, if the static image presents the first side of the target, it means that the target currently in static faces the image capturing device 110 with the first side and that step S1404 is performed; otherwise, the flow process of FIG. 7 is performed.

In some embodiments, a method of determining whether the image presents the first side of the target is, for example, looking for whether a feature of the first side of the target is included in the target in the image. If so, the target in the image is determined to be the first side of the target, or otherwise, the target in the image is determined to be a second side of the target.

In this embodiment, a first side of the human face is, for example, a front face, and the second side is, for example, a profile face. Hence, a nose is taken as a determination feature of the front face. The processor 120, for example, looks for the nose in the human face in the static image. If the nose is found, the human face in the static image is the front face. On the contrary, if the nose is not found, it means that although the human face is determined to be present in the region of interest of the static image in step S1401, since the determination feature of the front face is not included, the human face in the static image is regarded as the profile face. Note that since the nose is in the center of the human face, in some embodiments, the processor 120 may look for the nose only in a region R80 representing 80% area of a central region of a human face outline FF as shown in FIG. 8, so as to reduce computation resources.

In step S1404, the processor 120 normalizes the target in the static image and stores a normalized image of the target. Normalization is used to rotate the image to be portrait, for example, so as to facilitate the following processing such as image comparison. To be specific, the first side of the target in the static images may not be always in the same orientation. The processor 120 may thereby normalize the images to rotate the images to be presented in a portrait orientation, but which is not limited herein. Similarly, the stored normalized image may also act as the reference image to be used in the following image analysis.

Figure 8:
FIG. 8 to FIG. 13 are schematic diagrams illustrating a posture determination method according to an embodiment of the disclosure.
Figure 9:

In this embodiment, as shown in FIG. 8, a connection line between two eyes of the front face in the static image is not necessarily horizontal (e.g., when the head is tilt). Hence, after obtaining the region R80 representing 80% area of the central region of the human face outline FF, the processor 120 may rotate the region R80 to enable the connection line between the two eyes to become horizontal. As such, the region R80 become a normalized image NF as shown in FIG. 9, and the normalized image NF is then stored.

Note that step S1404 is optional. In some embodiments, after the static image is determined by the processor 120 to present the first side of the target in step S1403, step S1405 is directly performed. In addition, in another embodiment, the first side of the target is determined to be present in a pre-defined orientation; thereby, no normalization is required in step S1404 to store the image of the first side of the target.

In step S1405, the processor 120 prompts that the target faces the image capturing device 110 with the first side, and then the processor 120 performs step S110 to continue acquiring the images. To be specific, since the processor 120 determines that the target faces the image capturing device 110 with the first side, the processor 120 issues a prompt message through the prompt device 130, so as to prompt that the target faces the image capturing device 110 with the first side.

Particularly, step S140 is performed when the processor 120 determines that the transition state of the image is the initial state, and step S110 is performed after step S140 to continue acquiring the images. In some embodiments, whether or not the image is static after step S140 is performed by the processor 120, the transition state is no longer the initial state. In other words, even though the image acquired by the processer 120 after step S140 is performed is still a static image, the processor 120 determines that the image is in the first state rather than the initial state, and that step S110 is not correspondingly performed to continue acquiring the images.

In this embodiment, the processor 120 issues a text message to a caregiver of an elderly person or a child through, for example, the prompt device 130 of the communication module, so as to prompt that the elderly person or the child faces the image capturing device 110 with his/her front face (i.e., lying on the back and not being covered by a blanket). In other embodiments, the processor 120 may also issue the prompt message through the prompt device 130 acting as, for example, a speaker or a display and the like, and the disclosure is not limited thereto.

Figure 5:
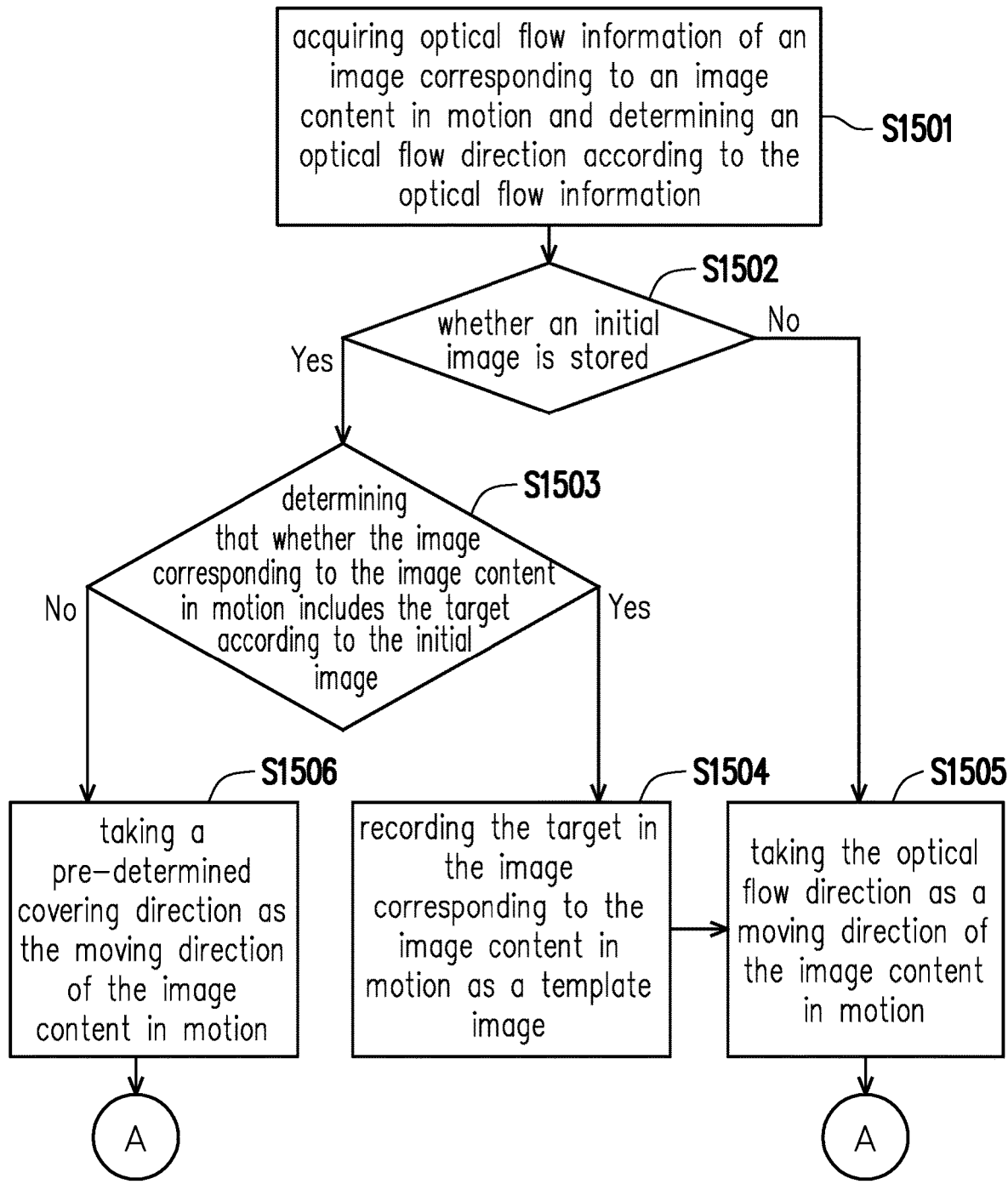

FIG. 5 is a flowchart illustrating step S150 in detail in an embodiment of the disclosure. When the steps illustrating a flow process in the embodiment of FIG. 5 are performed, it means that the current image content is changed to be in motion after being static or remains in motion. With reference to FIG. 5, in step S1501, the processor 120 acquires the optical flow information of the image corresponding to the image content in motion and determines an optical flow direction according to the optical flow information. Since the consecutive images in step S1501 include the image content in motion, the processor 120 acquires the consecutive images to perform calculations on the optical flow information for determining the optical flow direction.

In this embodiment, the Lucas-Kanade optical flow algorithm of OpenCV is adopted by the processor 120, for example. In this way, identical feature point positions (e.g., boundary points or corner-points) are identified in a plurality of images, and then differences in positions of the feature points in the respective images are used to calculate displacement vectors of the feature points. The displacement vectors of the different positions in the images are optical flows. Those having ordinary skill in the art may obtain sufficient algorisms (e.g., Canny edge detection algorithm, Harris corner detection algorithm, etc.) for calculating the optical flow information and identifying the feature points from relevant literature, and the disclosure is not limited thereto.

Figure 10:
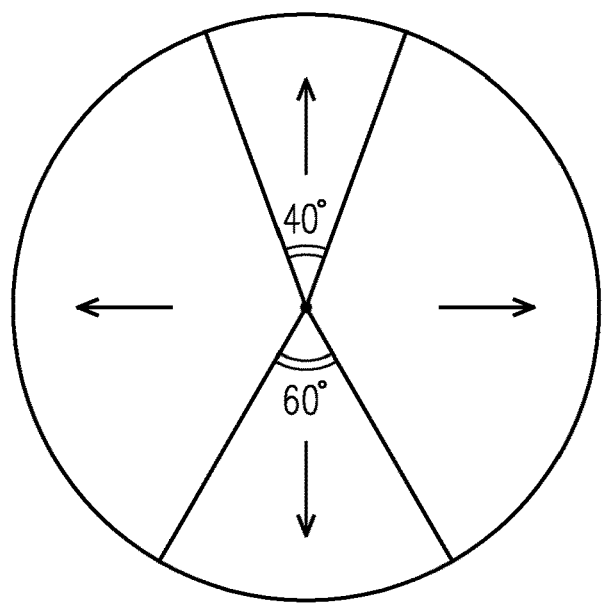

In this embodiment, the processor 120 categorizes the displacement vectors into four directions of up, down, left, and right. As shown in FIG. 10, the displacement vector pointing upwards within 40 degrees is categorized as the direction "up" and is represented by the up arrow in FIG. 10; the displacement vector pointing downwards within 60 degrees is categorized as the direction "down" and is represented by the down arrow in FIG. 10; the displacement vector pointing leftwards within 130 degrees is categorized as the direction "left" and is represented by the left arrow in FIG. 10; the displacement vector pointing rightwards within 130 degrees is categorized as the direction "right" and is represented by the right arrow in FIG. 10. In this way, the direction "up" is rather accurately determined, and thus, a situation in which the elderly person or the child pulls up a blanket to cover his/her face can be determined more accurately. Nevertheless, those having ordinary skill in the art may design other methods to categorize the displacement vectors, and the disclosure is not limited thereto.

In this embodiment, the processor 120 filters the optical flows, that is, only the displacement vectors with higher reliability are retained. The processor 120 performs filtering by using different methods according to situations in which faces are present or not in the consecutive images.

For instance, the processor 120 may determine whether the situation is a "with face" situation or a "without face" situation according to a determination result of a previous posture. If the determination result of the previous posture is determined to be "facing image capturing device 110 with front face" or "lying on the back", the "with face" situation is determined. If the determination result of the previous posture is determined to be "facing image capturing device 110 with profile face" or "lying on the side", the "without face" situation is then determined. If the determination result of the previous posture is determined to be "face covered by blanket", the "without face" situation is determined. In another embodiment, the processor 120 may also determine the "with face" situation or the "without face" situation according to whether the initial image or the reference image is stored previously.

Figure 11:
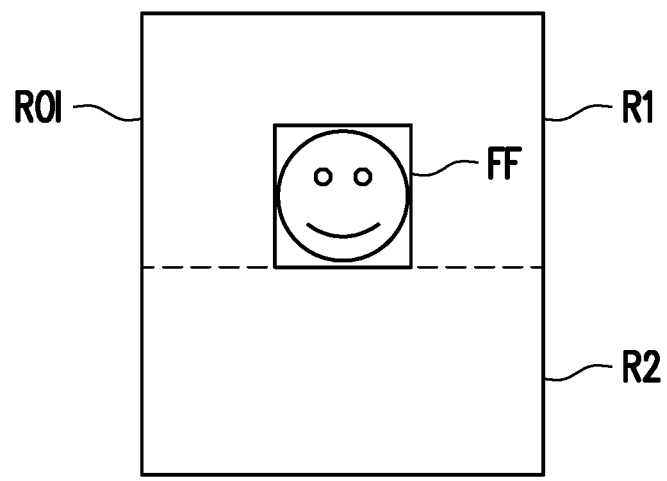

The "with face" situation is shown in FIG. 11. The optical flows categorized as the direction "up" may lead to the dangerous "face covered by blanket" situation, and thus, only the optical flows passing through the human face outline FF and having a length of displacement vector greater than a length threshold are retained. For instance, the length threshold may be set to be 30% of a height of the region of interest ROI. In other words, overly small optical flows may be regarded as noise signals and thus are excluded. The optical flows in the direction "left" or the direction "right" may be used to determine whether a rolling over movement is present. Therefore, only the shoulder and portions under the shoulder, that is, only the optical flows located at a region R2 below the human face outline FF are retained, and the optical flows located at a region R1 in the direction "left" or the direction "right" are excluded. In addition, the optical flows in the direction "down" do not lead to the dangerous "face covered by blanket" situation and thus are all excluded, so as to reduce computation time.

Figure 12:
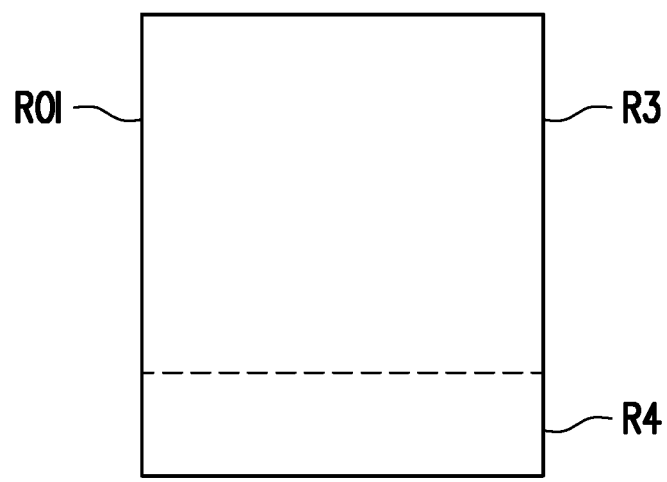

The "without face" situation is shown in FIG. 12. In such situation, the region of interest ROI is, for example, divided into an upper ¾ region R3 and a lower ¼ region R4, but the disclosure is not limited thereto. The optical flows in the direction "up" are required to pass through the shoulder to be regarded as the movement of pulling up a blanket which may lead to the "face covered by blanket" situation. Hence, only the optical flows in the direction "up" passing through the region R4 and having a length of displacement vector greater than the length threshold (e.g., 30% of the height of the region of interest ROI) are retained. The optical flows in the direction "left" or the direction "right" may be used to determine whether a rolling over movement is present. Therefore, only the shoulder and the portions under the shoulder, that is, only the optical flows located at the region R4 are retained, and the optical flows located at the region R3 in the direction "left" or the direction "right" are excluded. In addition, the optical flows in the direction "down" do not lead to the dangerous "face covered by blanket" situation and thus are all excluded.

Note that the region of interest ROI in the foregoing embodiment is, for example, the upper part of a bed with a pillow. Hence, the region of interest ROI is divided into the region R3 above the shoulder and the region R4 below the shoulder based on a predicted position of the shoulder. Nevertheless, the disclosure is no limited thereto, and those having ordinary skill in the art may design how the optical flows are filtered as required.

In this embodiment, the processor 120 determines the direction of the optical flows after the optical flows are filtered according to the remaining optical flows. For instance, the processors 120 may count the directions (e.g., including the up, left, and right directions) of the categorized displacement vectors corresponding to the remaining optical flows, and the direction with the greatest number is the optical flow direction. Nevertheless, the disclosure is not limited thereto.

In step S1502, the processor 120 determines whether the initial image is stored. To be specific, if the target is found in the static image by the processor 120 in step S1401 of the embodiment of FIG. 4, the initial image of the target is stored in step S1402. Hence, the processor 120 determines that whether the initial image of the target is stored in the storage device. If yes, step S1503 is preformed. Otherwise, step S1505 is preformed, and the optical flow direction is served as the moving direction of the image content in motion.

In this embodiment, the processor 120 determines that whether the human face image serving as the initial image is stored in the storage device. If yes, it means that the target is found in step S1402 of the embodiment of FIG. 4 and the initial image of the target is stored. Otherwise, it means that the target in the static image in the embodiment of FIG. 4 does not exist or is covered, and that the optical flow direction calculated in step S1501 by the processor 120 is used as the moving direction of the image content in motion, and the moving direction is recorded in the storage device.

In step S1503, the processor 120 determines that whether the image content in motion includes the target according to the initial image. To be specific, the processor 120 traces the target in the image content of one of the consecutive images (e.g., the last one of the consecutive images corresponding to the current state) based on the initial image. If the target is included in the image content, step S1504 is performed. On the contrary, step S1506 is performed, and the pre-determined covering direction is used as the moving direction of the image content in motion.

In this embodiment, the processor 120 performs tracing by using, for example, the Facial Landmark of OpenCV and determines whether a human face is included in the image content based on the initial image. For instance, the processor 120 sets up a first similarity threshold. When a contour similar to a human face contour in the initial image is included in the image content being traced (e.g., having a degree of similarity higher than the first similarity threshold), the human face is determined to be included in the image content. If the processor 120 determines that the human face is not included, it means that the human face may be covered by a blanket owing to a movement of pulling put the blanket. Hence, the processor 120 uses the pre-determined covering direction (e.g., the direction "up") as the moving direction of the image content in motion and records the moving direction in the storage device.

In step S1504, the processor 120 records the target in the image corresponding to the image content in motion as a template image, performs step S1505, and uses the optical flow direction as the moving direction of the image content in motion.

In this embodiment, the processor 120 stores the human face traced in the image content as a face template, uses the optical flow direction calculated in step S1501 as the moving direction of the image content in motion, and records the moving direction in the storage device.

After obtaining the moving direction of the image content in motion, the processor 120 performs step S110 and continues acquiring the consecutive images.

Figure 6:
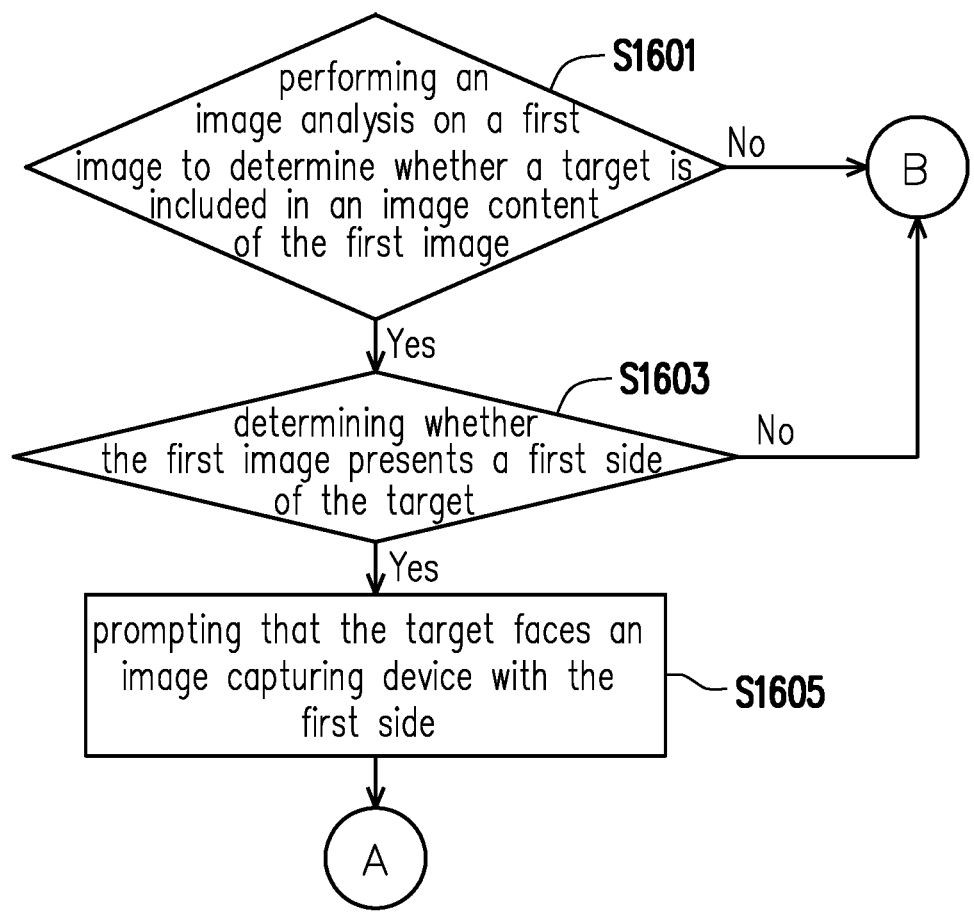

FIG. 6 is a flowchart illustrating step S160 in detail in an embodiment of the disclosure. When the steps illustrating a flow process of the embodiment of FIG. 6 are performed, it means that the current image content is static after a movement. In the consecutive images, the image with the static image content is called as a first image in the embodiment of FIG. 6. For instance, if a image and a n+1$^{th}$ image in the consecutive images are identical, the n$^{th}$ image and the n+1$^{th}$ image may both be called as the first images.

Note that since the first image is also a static image, a flow process in the embodiment of FIG. 6 is similar to the flow process of the embodiment of FIG. 4. A difference therebetween includes that when the steps of flow process of the embodiment of FIG. 6 are performed, the stored initial image acting as the reference image or the normalized image is not required to be stored again since the image content is no longer in the initial state. In other words, step S1601, step S1603, and step S1605 in the embodiment of FIG. 6 are respectively similar to step S1401, step S1403, and step S1405 in the embodiment of FIG. 4. A difference therebetween includes that if the processor 120 determines that the target is included in the image content of the first image in step S1601, step S1603 is directly performed to determine whether the first image represents the first side of the target, and that the initial image of the target is not required to be stored. Further, in step S1603, if the processor 120 determines that the first image represents the first side of the target, step S1605 is directly performed to prompt that the target faces the image capturing device 110 with the first side, and that the normalized image of the target is not required to be established and stored again.

With reference to FIG. 6, in step S1601, the processor 120 performs an image analysis on the first image to determine whether the target is included in the image content of the first image. Step S1603 is performed if the target is determined to be included in the first image, or otherwise, the flow process of FIG. 7 is performed to determine the posture of the target according to the previous moving direction of the image content (to be described in details in following description).

In this embodiment, it means that the person lying on the bed may have rolled over or pulled up a blanket and becomes static after the movement (e.g., after rolling over or pulling up the blanket). Hence, in step S1601, the processor 120 performs the image analysis on the static image to determine whether a human face is still included in the image content. The method of image analysis to determine the human face is illustrated in the relevant paragraphs of step S1401, and thus is not repeated hereinafter.

In step S1603, the processor 120 determines whether the first image represents the first side of the target. To be specific, if the first image represents the first side of the target, it means that the target currently in static faces the image capturing device 110 with the first side. Step S1605 is performed if the first image is determined to be the first side of the target, or otherwise, the flow process of FIG. 7 is performed to determine the posture of the target according to the previous moving direction of the image content.

In this embodiment, the processor 120 may, for example, look for the nose of the human face in the first image. If the nose is found, the human face in the first image is much likely to be a front face, or otherwise, the human face in the first image is much likely to be a profile face.

In step S1605, the processor 120 prompts that the target faces the image capturing device 110 with the first side, and then the processor 120 performs step S110 to continue acquiring the images. To be specific, since the processor 120 determines that the target faces the image capturing device 110 with the first side, the processor 120 issues a prompt message through the prompt device 130, so as to prompt that the target faces the image capturing device 110 with the first side.

In this embodiment, the processor 120 issues a text message to a caregiver of an elderly person or a child through, for example, the prompt device 130 of the communication module, so as to prompt that the elderly person or the child faces the image capturing device 110 with his/her front face (i.e., lying on the back and not being covered by a blanket). In other embodiments, the processor 120 may also issue the prompt message through the prompt device 130 acting as, for example, a speaker or a display and the like, and the disclosure is not limited thereto. In another embodiment, the prompt device 130 may display all movements or determination results recorded in a specific period of time, such as "facing with front face→showing movement (rolling over)→profile face". In this case, the medical staff may presume the current posture of the target or the posture of the person being cared for and perform counting (e.g., counting the number of times of rolling over) or the like.

Note that although the processor 120 has already stored the initial image acting as the reference image or the normalized image, the processor 120 may store a new initial image or normalized image again in the flow process in the embodiment of FIG. 6.

In some embodiments, after determining that the target is included in the image content of the first image in step S1601, the processor 120 may, for example, store the initial image of the target first and then performs step S1603. In other words, the processor 120 updates the initial image of the target stored in step S1402 of the embodiment of FIG. 4. In some embodiments, after determining that the first image is the first side of the target in step S1603, the processor 120, for example, normalizes the target in the first image, stores the normalized image of the target, and then performs step S1605. In other words, the processor 120 updates the normalized image of the target stored in step S1404 of the embodiment of FIG. 4.

FIG. 7 illustrates a flowchart of determining a posture of a target in an embodiment of the disclosure. When the steps of the flow process of FIG. 7 are performed, it means that the target does not face the image capturing device 110 with the first side. That is, the processor 120 can not find the target in the static image after performing the image analysis or determines that the image does not present the first side of the target after finding the target in the static image. Hence, the target may be covered or faces the image capturing device 110 with the second side different from the first side.

In step S210, the processor 120 determines that whether the moving direction of the image content is previously obtained. If so, step S220 is performed, or otherwise, step S110 is performed to continue acquiring the consecutive images. To be specific, if the image content is once in motion, step S150 would have been performed and that the moving direction of the image content would have been obtained by the processor 120. Hence, if the processor 120 determines that the moving direction of the image content was not previously acquired in step S210, it means that the transition state of the image content of the consecutive images is the initial state or the first state when this step is performed, so that step S150 is not performed yet. If the processor 120 determines that the moving direction of the image content was previously acquired in step S210, it means that the transition state of the image content of the consecutive images is in the fourth state when this step is performed, so that step S150 was performed and the moving direction of the image content was obtained.

In this embodiment, previously, when acquiring the moving direction of the image content, the processor 120 simultaneously recorded the moving direction in the storage device, and thereby the processor 120 may determine whether the moving direction of the image content was previously acquired through determining whether the moving direction of the image content is recorded in the storage device.

In step S220, the processor 120 determines that whether the moving direction is the pre-determined covering direction. If yes, step S240 is performed, or otherwise, step S230 is performed. To be specific, the pre-determined covering direction is configured for representing a movement direction in which the target has a chance to be covered. That is, if the moving direction of the image content is the pre-determined covering direction, the target is much likely to be covered. Therefore, the processor 120 first compares the moving direction of the image content previously obtained with the pre-determined covering direction. If the moving direction is identical to the pre-determined covering direction, step S240 is performed to further determine whether the target is covered. If the moving direction is different from the pre-determined covering direction, meaning that the moving direction of the image content is different from the pre-determined covering direction, step S230 is performed.

In this embodiment, since the "face covered by blanket" movement caused by pulling up a blanket is the direction "up" in the moving direction of the image content, the pre-determined covering direction is the direction "up". The processor 120 determines that whether the moving direction recorded in the storage device is the direction "up". If yes, the processor 120 further determines whether the human face is covered owing to the movement of pulling up the blanket according to the image content. If no, it means that the "pulling up blanket" situation does not occur, and that the posture is determined to be "facing the image capturing device 110 with profile face" or "lying on the side".

In step S230, the processor 120 prompts that the target faces the image capturing device 110 with the second side different from the first side, and then the processor 120 performs step S110 to continue acquiring the images. To be specific, since the processor 120 determines that the target faces the image capturing device 110 with the second side, the processor 120 issues a prompt message through the prompt device 130, so as to prompt that the target faces the image capturing device 110 with the second side.

Figure 13:
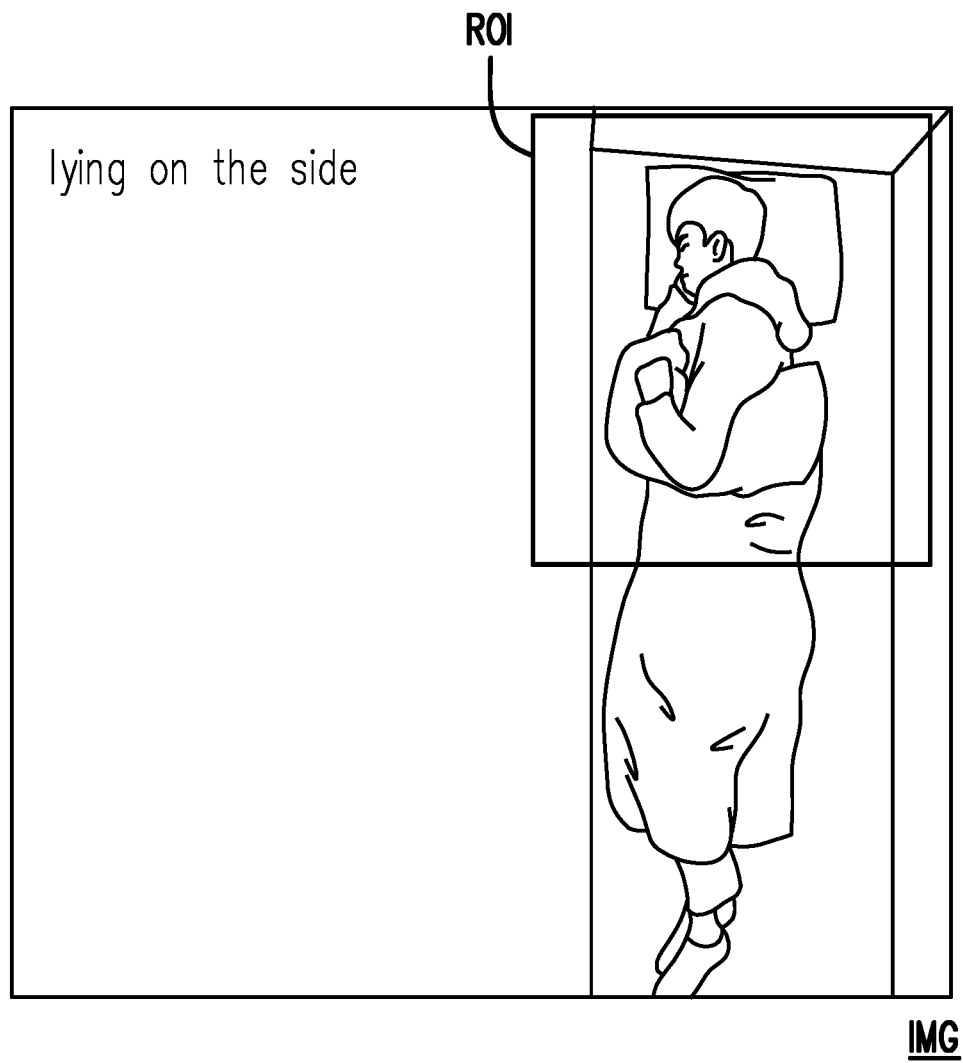

In this embodiment, a prompt message such as a text message or an e-mail and the like having content including a current image information IMG is sent to a caregiver of an elderly person or a child by the processor 120 through, for example, the prompt device 130 of the communication module as shown in FIG. 13. In this way, the processor 120 may prompt that the elderly person or the child faces the image capturing device 110 by lying on the side (for example but is not limited to, prompting with texts on the upper left corner of the current image information IMG). In other embodiments, the processor 120 may also issue the prompt message through the prompt device 130 acting as, for example, a speaker or a display and the like, and the disclosure is not limited thereto.

In step S240, the processor 120 determines whether the template image is recorded. If yes, step S250 is performed, or otherwise, step S110 is performed to continue acquiring the images. To be specific, even though the image content was once in motion and that the moving direction of the image content was obtained by the processor 120, no template image was recorded since the target was not included in the image content in motion (e.g., step S1603 in the embodiment of FIG. 6: no). Nevertheless, when the moving direction is determined to be the pre-determined covering direction in step S220 and the template image is recorded in step S240, the processor 120 further determines whether the target is covered according to a degree of similarity between the template image and the reference image (e.g., the initial image or the normalized image recorded in the storage device).

For instance, the processor 120, for example, sets a second similarity threshold higher than the first similarity threshold and determines whether the degree of similarity between the template image and the reference image is higher than the second similarity threshold or determines whether contours whose degree of similarity therebetween is higher than the second similarity threshold are included in the template image and the reference image. To be specific, if the degree of similarity between the template image and the reference image is excessively low, or no contours whose degree of similarity therebetween is higher than the second similarity threshold are included in the template image and the reference image, it means that a contour considerably similar to the target can no longer be found in the template image, and that the target is much likely to be covered; otherwise, the contour of the target exists in the template image, and the target is ensured not to be covered.

In this embodiment, the processor 120 determines whether the template image is recorded in the storage device. To be specific, if the template image is recorded in the storage device, it means that the target was determined to be included in the image content in motion by the processor 120. Hence, the processor 120 can compare the degree of similarity with a benchmark and determine whether a contour similar to the target is included in the current image content or the previous image content in motion, and then step S250 is performed. On the contrary, if the processor 120 can not compare the degree of similarity with a benchmark, step S110 is performed to continue acquiring the images.

In step S250, the processor 120 determines whether the degree of similarity between the template image and the reference image is higher than a pre-determined threshold. If yes, step S230 is performed to prompt that the target faces the image capturing device 110 with the second side; otherwise, step S260 is performed to prompt that the target is covered. Herein, the pre-determined threshold is, for example, the second similarity threshold set by the processor 120. Nevertheless, an actual value of the pre-determined threshold may vary according to different user requirements and different calculation methods for calculating the degree of similarity, and the disclosure is not limited thereto. When the degree of similarity between the template image and the reference image is higher than the pre-determined threshold, it means that the contour of the target exists in the template image, and that the target may be regarded as facing the image capturing device 110 with the second side and not being covered. In contrast, when the degree of similarity between the template image and the reference image is not higher than the pre-determined threshold, it means that a contour similar to the target is no longer found in the template image, and that the target may be regarded as being covered.

In this embodiment, the processor 120 calculates a degree of similarity between the template image and the normalized image NF recorded in the storage device. If the normalized image NF is not recorded in the storage device, the processor 120 calculates a degree of similarity between the template image and the initial image recorded in the storage device. Note that specific ways of calculating the degree of similarity between two images are not limited by the disclosure.

For instance, the processor 120 may adopt the histogram of oriented gradient (HOG) to calculate the degree of similarity, that is, to look for a contour in the template image which is similar to the human face in the reference image. Since the human face in the reference image presents a contour of, for example, a "Ω" shape regardless of a front face or a profile face, the processor 120 may, for example, look for a contour similar to the "Ω" shape in the template image. If the human face in the template image is covered by a blanket, a contour with a shape similar to the "Ω" shape is not to be found in the template image. On the contrary, if the human face in the template image is not covered by a blanket, a contour with a shape similar to the "Ω" shape is to be found in the template.

In step S260, the processor 120 prompts that the target is covered and performs step S110 to continue acquiring the images. To be specific, since the processor 120 can not find a contour in the template image which is similar to the human face in the reference image, the processor 120 determines that the target is covered and issues a prompt message through the prompt device 130 to prompt that the target is covered.

In this embodiment, the processor 120 issues a text message to a caregiver of an elderly person or a child through, for example, the prompt device 130 of the communication module, so as to prompt that the face of the elderly person or the child is covered by a blanket. In other embodiments, the processor 120 may also issue the prompt message through the prompt device 130 acting as, for example, a speaker or a display and the like, and the disclosure is not limited thereto.

According to the posture determination method and the electronic system 100 introduced in this embodiment, the caregiver may instantly monitor the elderly person or the child lying on the bed. When the elderly person or the child becomes static after a movement (e.g., pulling up a blanket), the caregiver receives a prompt to be notified of whether the elderly person or the child is in a dangerous situation (e.g., face covered by the blanket).

In some embodiments, the processor 120 of the electronic system 100 calculates posture-related statistical information (e.g., the number of times of rolling over and the like) according to the determination results (e.g., including lying on the back, lying on the side, and face covered by blanket) acquired. The statistical information is included in the prompt message and is sent through the prompt device 130.

In an embodiment of the disclosure, a non-transitory computer-readable recording medium is further provided in which a computer program is stored. The computer program is configured for performing each step in the posture determination method. The computer program is composed by a plurality of code segments. The code segments may perform the posture determination method after being loaded to a computer or a processor and being executed.

In view of the foregoing, in the posture determination method, the electronic system, and the non-transitory computer-readable recording medium provided by the embodiments of the disclosure, the motion detection is performed on the consecutive images captured by the image capturing device. In this way, the image of which the image content is static after a movement is found from the consecutive images, so as to perform the image analysis to determine the posture of the target when the target is static after the movement. Since the motion detection can be completed by using, for example, the optical flow information, the calculation resources required to be consumed by the motion detection are considerably less than the calculation resource required to be consumed by the image analysis. Therefore, in the embodiments of the disclosure, the computation load is significantly reduced, and the cost-saving and reliable posture determination method and tool are provided.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A posture determination method, applicable to an electronic system comprising an image capturing device, wherein the image capturing device is set up corresponding to a target, and the posture determination method comprises:
    acquiring a plurality of consecutive images captured by the image capturing device;
    performing a subtraction operation on two images selected from the consecutive images to generate an image difference result so as to determine whether an image content of the consecutive images has a movement;
    determining whether the image content of the consecutive images is static after the movement according to the image difference result; and
    determining a posture of the target in response to that the image content is static after the movement, wherein the target is a head contour,
    wherein the step of determining the posture of the target in response to that the image content is static after the movement comprises:
        calculating a degree of similarity between a template image of the target and a reference image of the target, wherein the template image of the target is a target image corresponding to the image content in the movement, and the reference image of the target is an initial target image captured by the image capturing device or a normalized target image.

2. The posture determination method as claimed in claim 1, further comprising:
    acquiring a moving direction of the image content in motion after a transition state of the image content is determined.

3. The posture determination method as claimed in claim 2, wherein the step of determining the posture of the target in response to that the image content is static after the movement further comprises:
    performing an image analysis on a first image corresponding to the image content is static after the movement to determine whether the first image comprises the target;
    determining the posture of the target according to the target in the first image when the first image is determined to comprise the target; and determining the posture of the target according to the moving direction when the first image is determined not to comprise the target.

4. The posture determination method as claimed in claim 3, wherein the step of determining the posture of the target according to the target in the first image when the first image is determined to comprise the target comprises:
   determining whether the first image comprises a feature of a first side of the target;
   determining the first side of the target faces the image capturing device when the first image is determined to comprise the feature of the first side; and
   determining the posture of the target according to the moving direction when the first image is determined not to comprise the feature of the first side.

5. The posture determination method as claimed in claim 4, wherein the step of determining the posture of the target according to the moving direction when the first image is determined not to comprise the target comprises:
   comparing the moving direction with a pre-determined covering direction;
   determining that a second side of the target faces the image capturing device when the moving direction is determined to be different from the pre-determined covering direction, wherein the second side is different from the first side; and
   determining whether the second side of the target faces the image capturing device or the target is covered according to the degree of similarity between the template image of the target and the reference image of the target when the moving direction is determined to be identical to the pre-determined covering direction.

6. The posture determination method as claimed in claim 2, wherein the step of acquiring the moving direction of the image content in motion after the transition state of the image content is determined comprises:
   acquiring a second image corresponding to the image content in motion in the consecutive images; and
   setting the moving direction as a pre-determined covering direction when the second image does not comprise the target.

7. The posture determination method as claimed in claim 2, wherein the step of acquiring the moving direction of the image content in motion after the transition state of the image content is determined comprises:
   acquiring optical flow information of an image corresponding to the image content in motion; and
   determining an optical flow direction according to the optical flow information.

8. The posture determination method as claimed in claim 1, further comprising:
   performing an image analysis on a static image in the consecutive images to acquire a reference image of the target.

9. The posture determination method as claimed in claim 1, further comprising:
   issuing a prompt message to prompt the determined posture of the target.

10. An electronic system, comprising:
    an image capturing device, set up corresponding to a target and configured to capture a plurality of consecutive images; and
    a processor, coupled to the image capturing device and configured to:
        acquire the consecutive images;
        performing a subtraction operation on two images selected from the consecutive images to generate an image difference result so as to determine whether an image content of the consecutive images has a movement;
        determine whether the image content of the consecutive images is static after the movement according to the image difference result; and
        determine a posture of the target in response to that the image content is static after the movement, wherein the target is a head contour,
    wherein when the processor determines the posture of the target in response to that the image content is static after the movement, the processor is configured to:
        calculating a degree of similarity between a template image of the target and a reference image of the target, wherein the template image of the target is a target image corresponding to the image content in the movement, and the reference image of the target is an initial target image captured by the image capturing device or a normalized target image.

11. The electronic system as claimed in claim 10, wherein the processor is further configured to:
    acquire a moving direction of the image content in motion after a transition state of the image content is determined.

12. The electronic system as claimed in claim 11, wherein when the processor determines the posture of the target in response to that the image content is static after the movement, the processor is further configured to:
    perform an image analysis on a first image corresponding to the image content is static after the movement to determine whether the first image comprises the target;
    determine the posture of the target according to the target in the first image when it is determined by the processor that the first image comprises the target; and
    determine the posture of the target according to the moving direction when it is determined by the processor that the first image does not comprise the target.

13. The electronic system as claimed in claim 12, wherein when the processor determines the posture of the target according to the target in the first image when it is determined by the processor that the first image comprises the target, the processor is further configured to:
    determine whether the first image comprises a feature of a first side of the target;
    determine the first side of the target faces the image capturing device when it is determined by the processor that the first image comprises the feature of the first side; and
    determine the posture of the target according to the moving direction when it is determined by the processor that the first image does not comprise the feature of the first side.

14. The electronic system as claimed in claim 13, wherein when the processor determines the posture of the target according to the moving direction, the processor is configured to:
    compare the moving direction with a pre-determined covering direction;
    determine that a second side of the target faces the image capturing device when it is determined by the processor that the moving direction is different from the pre-determined covering direction, wherein the second side is different from the first side; and
    determining whether the second side of the target faces the image capturing device or the target is covered according to the degree of similarity between the template image of the target and the reference image of the target when it is determined by the processor that the moving direction is identical to the pre-determined covering direction.

15. The electronic system as claimed in claim 11, wherein when the processor acquires the moving direction of the image content in motion after the transition state of the image content is determined, the processor is configured to:
   acquire a second image corresponding to the image content in motion in the consecutive images; and
   set the moving direction as a pre-determined covering direction when the second image does not comprise the target.

16. The electronic system as claimed in claim 11, wherein the processor is further configured to:
   perform an image analysis on a static image in the consecutive images to acquire a reference image of the target.

17. The electronic system as claimed in claim 11, wherein when the processor acquires the moving direction of the image content in motion after the transition state of the image content is determined, the processor is configured to:
   acquire optical flow information of an image corresponding to the image content in motion; and
   determining an optical flow direction according to the optical flow information.

18. The electronic system as claimed in claim 10, further comprising:
   a prompt device, coupled to the processor, wherein the processor is further configured to issue a prompt message through the prompt device to prompt the posture of the determined target.

19. A non-transitory computer-readable recording medium, storing a program code, wherein a posture determination method is performed when the program code is loaded to a computer and executed, wherein the posture determination method comprises:
   acquiring a plurality of consecutive images;
   performing a subtraction operation on two images selected from the consecutive images to generate an image difference result so as to determine whether an image content of the consecutive images has a movement;
   determine whether the image content of the consecutive images is static after the movement according to the image difference result; and
   determining a posture of a target in response to that the image content is static after the movement, wherein the target is a head contour,
   wherein the step of determining the posture of the target in response to that the image content is static after the movement comprises:
      calculating a degree of similarity between a template image of the target and a reference image of the target, wherein the template image of the target is a target image corresponding to the image content in the movement, and the reference image of the target is an initial target image captured by the image capturing device or a normalized target image.

* * * * *